Patented May 18, 1937

2,080,543

UNITED STATES PATENT OFFICE 2,080,543

TREATMENT OF DYEINGS PREPARED ON CELLULOSE MATERIALS BY MEANS OF SUBSTANTIVE DYESTUFFS

Ferdinand Münz, Frankfort-on-the-Main, and Karl Keller, Frankfort-on-the-Main-Fechenheim, Germany, assignors to General Aniline Works, Inc., New York, N. Y., a corporation of Delaware No Drawing. Application February 4, 1935, Serial No. 4,986. In Germany February 16, 1934

2 Claims. (Cl. 8—5)

Our present invention relates to improvements in the treatment of dyeings prepared on cellulose materials by means of substantive dyestuffs, with a view to increasing their fastness. U. S. Patent 2,040,061 which matured from application Serial Number 747,078, filed October 5, 1934 by Ferdinand Münz and Karl Keller relates to the manufacture and application of new quaternary ammonium compounds by further alkylating a mixture of polyamines in particular polyethylene polyamines of the general formula:

$$H_2N-(C_2H_4NH)_nC_2H_4NH_2$$

in admixture with compounds of the general formula:

$$(C_2H_4NH)_n,$$

in which formulae $n$ is greater than 2 which mixture is obtainable, for instance, by the action of aqueous ammonia on di-halogen, i. e., ethylene chloride and its higher homologues (see Berichte, Vol. 23, page 3711) and by removing by distillation the fractions of the formed mixture boiling under 10 mm. pressure up to 220° C.

Our present invention is based on the discovery that the aforesaid mixtures of highly polymeric bases are useful themselves (without further alkylation) in the form of their salts with inorganic or organic acids or when applied only with the addition of an inorganic or organic acid. In accordance with our invention, on after-treatment therewith of dyeings which have been prepared on cellulose materials by means of substantive dyestuffs, the fastness of the said dyeings is improved, although not to such a far-reaching extent as when using the corresponding ammonium compounds; in particular no improvement occurs in strongly alkaline baths. In cases, however, where it is only intended to improve the fastness to water, boiling acids and ironing in a moist state, the application of the present salts yields in a very simple and cheap manner very good results.

Compared with the bases hitherto used for the aforesaid purposes, which bases contain alkyl radicles of at least 7 carbon atoms, the highly polymeric polyamines employed in the present case are distinguished by the advantage that very small quantities are sufficient, probably owing to their low molecular weight.

In order to further illustrate our invention the following example is given; but we wish it, however, to be understood that our invention is not limited to the particular products or reaction conditions stated therein.

Example

Cotton yarn, previously dyed, for instance, with the dyestuff; sirius blue BR (Schultz, Farbstofftabellen 7th edition (1931), 2nd volume, page 197) is treated for about 20 minutes with a solution containing per liter 0.1 g. of the residue (a viscous brown liquor) of a mixture of polyethylene polyamines, obtained by treating aqueous ammonia with ethylene chloride (Berichte, Vol. 23, page 3711), from which the fraction boiling under 10 mm. pressure up to 220° C. has been distilled off, and 0.5 grs. of formic acid. The goods are subsequently rinsed. The dyeing does not bleed to any extent in non-alkaline baths.

Instead of formic acid likewise other organic or mineral acids may be used.

We claim:

1. Improvements in the treatment of dyeings prepared on cellulose materials by means of substantive dyestuffs which comprise after treating dyeings which have been prepared on cellulose materials by means of substantive dyestuffs with a mixture of polyethylene polyamines of the formula:

$$H_2N-(C_2H_4NH)_nC_2H_4NH_2$$

and compounds of the formula $(C_2H_4NH)_n$, $n$ in both formulae standing for a number greater than 2, containing only trivalent nitrogen atoms, in the form of their salts with acids.

2. A composition suitable for the after-treatment of dyeings prepared on cellulose materials by means of substantive dyestuffs comprising a mixture of polymeric ethylene-polyamines of the formula:

$$H_2N-(C_2H_4NH)_nC_2H_4NH_2$$

in association with a compound of the formula $(C_2H_4NH)_n$, $n$ in both formulae standing for a number greater than 2, containing only trivalent nitrogen atoms, in the form of their salts with acids.

FERDINAND MÜNZ.
KARL KELLER.